US007324045B2

(12) United States Patent
Mo et al.

(10) Patent No.: US 7,324,045 B2
(45) Date of Patent: Jan. 29, 2008

(54) SYSTEM AND METHOD FOR FAST INITIALIZATION OF NAVIGATIONAL SATELLITE SIGNAL RECEIVERS

(75) Inventors: Jun Mo, San Jose, CA (US); Hansheng Wang, San Jose, CA (US); Chi-Shin Wang, Half Moon Bay, CA (US); Shaowei Han, Palo Alto, CA (US); Kudrethaya A. Shridhara, Cupertino, CA (US)

(73) Assignee: SiRF Technology, Inc., San Jose, CA (US)

( * ) Notice: Subject to any disclaimer, the term of this patent is extended or adjusted under 35 U.S.C. 154(b) by 159 days.

(21) Appl. No.: 11/124,413

(22) Filed: May 6, 2005

(65) Prior Publication Data

US 2006/0250304 A1 Nov. 9, 2006

(51) Int. Cl.
  *G01S 1/00* (2006.01)
  *H04B 7/185* (2006.01)
  *H04B 1/00* (2006.01)
(52) U.S. Cl. .......................... 342/357.15; 342/357.12; 342/357.02; 375/147
(58) Field of Classification Search ................ 342/357, 342/70; 701/209
  See application file for complete search history.

(56) References Cited

U.S. PATENT DOCUMENTS

| | | | | |
|---|---|---|---|---|
| 4,928,107 A | * | 5/1990 | Kuroda et al. ......... | 342/357.15 |
| 5,155,491 A | * | 10/1992 | Ando .................... | 342/357.15 |
| 5,185,761 A | * | 2/1993 | Kawasaki ............... | 375/130 |
| 5,192,957 A | * | 3/1993 | Kennedy ................ | 342/357.12 |
| 5,646,843 A | * | 7/1997 | Gudat et al. ................ | 701/3 |
| 5,731,786 A | * | 3/1998 | Abraham et al. ....... | 342/357.08 |
| 5,784,027 A | | 7/1998 | Davis ......................... | 342/357 |
| 6,114,992 A | | 9/2000 | Underbrink ............. | 342/357.15 |
| 6,184,824 B1 | | 2/2001 | Bode et al. ............ | 342/357.15 |
| RE37,408 E | * | 10/2001 | Loomis et al. ......... | 342/357.12 |
| 6,449,478 B1 | | 9/2002 | Valentine et al. ........... | 455/430 |
| 6,459,405 B1 | | 10/2002 | Da et al. ................ | 342/357.09 |

(Continued)

OTHER PUBLICATIONS

IEEE0-07803-8416-04/04, 2004 "GDOP Results in All-in-view Positioning", Yang Yong et al.*

(Continued)

*Primary Examiner*—Thomas H. Tarcza
*Assistant Examiner*—Harry Liu
(74) *Attorney, Agent, or Firm*—Orrick, Herrington & Sutcliffe LLP

(57) ABSTRACT

The present invention provides a method and apparatus for a satellite navigation receiver to lock onto satellite signals in the cold start mode with no information on the receiver position, the satellite position, or time estimates stored in the receiver's memory. All satellites in a positioning system are divided into groups based on the satellite constellation structure. In an embodiment, the positioning system is the Global Positioning System (GPS) and all GPS satellites are divided into three groups. During initialization of the receiver, the satellites are searched per group to lock onto at least one satellite signal. Other satellites are then searched in a given order based on their respective distance or proximity to the first satellite acquired. This method reduces the Time-to-First-Fix (TTFF) ordinarily required by conventional receivers in the cold start mode.

19 Claims, 5 Drawing Sheets

U.S. PATENT DOCUMENTS

| | | | |
|---|---|---|---|
| 6,496,533 B2* | 12/2002 | Lennen | 375/147 |
| 6,683,564 B1* | 1/2004 | McBurney | 342/357.02 |
| 6,768,767 B1 | 7/2004 | Miyahara | 375/130 |
| 6,772,065 B2 | 8/2004 | Sanmiya et al. | 701/213 |
| 2002/0027949 A1* | 3/2002 | Lennen | 375/147 |
| 2003/0165186 A1* | 9/2003 | Kohli et al. | 375/150 |
| 2003/0187576 A1 | 10/2003 | Sanmiya et al. | 701/213 |
| 2003/0201933 A1* | 10/2003 | Cohen et al. | 342/357.12 |
| 2003/0231132 A1* | 12/2003 | Park et al. | 342/357.15 |
| 2005/0134440 A1* | 6/2005 | Breed | 340/435 |
| 2006/0152409 A1* | 7/2006 | Raman et al. | 342/357.15 |
| 2006/0250304 A1* | 11/2006 | Mo et al. | 342/357.15 |

OTHER PUBLICATIONS

GPS basics-FAQ, p. 2, http://gps.faa.gov/FAQ.*

Motorola GPS Products—Oncore User's Guide, Chapter 3—Receiver Description, Revision 5.0, Aug. 2002, pp. 3.1-3.50.

Motorola GPS Products, Semiconductor Technical Data, Product Preview—FS Oncore—Sprecifications Revision 0.2, Aug. 2004, 4 pages [Retrieved from <URL: http://www.motorola.com/ies/GPS/docs_ pdf/fs_prod_preview.pdf> on Apr. 22, 2005].

TTFF comparisons, Pocket GPS World, May 2003, 3 pages [Retrieved from <URL: http://www.pocketgps.co.uk/ttffcomparisons.php> on Apr. 22, 2005].

* cited by examiner

SYSTEM AND METHOD FOR FAST INITIALIZATION OF NAVIGATIONAL SATELLITE SIGNAL RECEIVERS

BACKGROUND OF THE INVENTION

1. Field of the Invention

This invention relates generally to satellite-based navigational signal receivers. More particularly, it relates to a system, method, and apparatus for fast initialization of such receivers in the cold start mode.

2. Description of the Related Art

There are several satellite-based radio navigation systems currently in operation or development—the Global Positioning System (GPS), the Global'naya Navigatsionnaya Sputnikovaya Sistema (GLONASS), and an European satellite navigation system called GALILEO. The GPS is built and operated by the United States Department of Defense (DoD). The official name is NAVSTAR, an acronym for NAVigation Satellite Timing and Ranging. These systems permit a user with an appropriate satellite signal receiver to determine his or her position with respect to the Earth.

The constellation consists of 24 operational satellites. Due to the presence of spare satellites in the GPS constellation, it is possible to have more than 24 operational satellites.

These satellites are positioned in six different orbital planes such that at any time a minimum of six and a maximum of eleven satellites are visible to any user on the surface of the Earth, except in the polar region. The satellites operate in circular 20,200 km (10,900 nm, or about 12,000 miles) orbits at an inclination angle of 55 degrees and with a 12-hour period. The position is therefore the same at the same sidereal time each day, i.e., the satellites appear 4 minutes earlier each day.

Each satellite contains at least one atomic clock and transmits an accurate time and position signal referenced to the atomic clock. Each satellite transmits on two L-band frequencies: L1=1575.42 MHz and L2=1227.6 MHz. Three sets of pseudo-random noise (PRN) ranging codes are in use: the coarse/acquisition (C/A) code, the precision (P) code, and the Y-code.

The C/A code set has a 1.023 MHz chip rate, a period of 1 millisecond (ms) and is used in non-military positioning and to acquire the P-code. The C/A code is available on the L1 frequency. The P code has a 10.23 MHz rate. The P-code is available on both L1 and L2 frequencies. The Y-code is used in place of the P-code whenever the anti-spoofing (A-S) mode of operation is activated. All GPS satellites transmit on the same frequencies, L1 and L2, but with different individual code assignments.

More specifically, each satellite transmits a navigation message containing its orbital elements, clock behavior, system time, and status messages. An almanac that gives the approximate data for each active satellite is also provided. An almanac allows the user to generate the visible satellite list during hot start.

Generally, a GPS receiver locks onto the GPS signal and extracts data contained therein. With signals from a sufficient number of satellites, the GPS receiver can triangulate its position, velocity, and time.

A typical GPS receiver comprises an antenna, processors, and a memory. The GPS receiver may have time, position, and almanacs stored in the memory. In this case, the receiver can use the stored information to compute the visible satellites and lock onto those satellite signals in a relatively short time. This type of initialization of the receiver is called hot start. Most of the GPS receivers are initialized in the hot start mode.

In cases where the receiver has partial, incomplete information on the position, time, and almanacs, the receiver may be initialized with a warm start. In cases where the receiver has no prior data on the position, time, and almanacs, the receiver must search all of the satellites present in the constellation. This is called cold start.

In the cold start mode, a conventional receiver may automatically select a set of satellites and dedicate an individual tracking channel to each satellite, to search the Doppler range frequency for each satellite in the set. If none of the selected satellites is acquired after a predetermined period of time (time-out), the receiver then selects a new search set of satellites. This process is repeated until the sufficient number of satellites are acquired. The typical Time-To-First-Fix (TTFF) is about 45 to 100 seconds. As satellites are acquired, the receiver downloads and stores ephemeris and almanac data.

U.S. Pat. No. 6,184,824, issued to Bode et al., discloses a method for initialization of a receiver. For a cold start, satellites positioned on two orbital planes that are as close as possible to perpendicular to one another (see FIG. 1) are selected for the search sets. After the first signal is acquired, the receiver downs and stores ephemeris from the detected satellite, which takes more than 12 minutes. Ephemeris data are part of the satellite data message and contain current satellite position and timing information. The receiver then calculates from the ephemeris the current occupancy of the various orbital planes by the satellites and generates a list of applicable search sets, which is another time consuming process. Since the ephemeris data are valid for several hours, the stored information must be updated periodically.

Clearly, there is a need in the art for a new system, method, and apparatus that provides fast initialization of satellite-based navigational signal receivers in the cold start mode. The present invention addresses this need.

BRIEF SUMMARY OF THE INVENTION

The present invention provides a method and apparatus for a satellite navigation receiver to lock onto satellite signals in the cold start mode with no information on the receiver position, the satellite position, or time estimates stored in the receiver's memory. According to the invention, all satellites in a positioning system are divided into groups based on the satellite constellation structure. During initialization of the receiver, the satellites are searched per group to lock onto at least one satellite signal (target). Other satellites are then searched according to a table based on their respective proximity to the target satellite.

In an embodiment of the invention, a method of reducing initialization time of a satellite signal receiver in the cold start mode comprises the steps of dividing navigational satellites of a positioning system into a plurality of groups such that each group has a fixed number of navigational satellites uniformly distributed over entire surface of the Earth, and configuring the receiver so that it searches for navigational satellites per group in an assigned order to acquire a first satellite in the cold start mode.

More specifically, during initialization in the cold start mode, a satellite signal receiver according to the invention first searches a first group of twelve navigational satellites. It then acquires a first navigational satellite from the first group. If no signal can be acquired from the first group, it shifts to search the satellites in the next group. Once the receiver locks onto the first satellite, the remaining satellites are acquired based on a two-dimensional matrix containing identification and statistical information of all navigational satellites of a positioning system.

In an embodiment, the positioning system is the Global Positioning System (GPS) and all GPS satellites are divided into three groups. Since not all satellites in the constellation must be searched, the present invention reduces the Time-to-First-Fix (TTFF) ordinarily required by conventional receivers in the cold start mode. That is, the time it takes a GPS receiver to find satellites after a user first turns it on is significantly less with the present invention. Furthermore, since the remaining satellites are acquired based on a table, no ephemeris-based computation would be necessary for the remaining satellite acquisition.

Other objects and advantages of the present invention will become apparent to one skilled in the art upon reading and understanding the preferred embodiments described below with reference to the following drawings.

DETAILED DESCRIPTION OF THE INVENTION

According to the invention, the term "initialization" refers to the first time a satellite-based navigation receiver acquires sufficient number of satellite signals and starts computing the position. After initialization, the receiver remembers its location and acquires a position more quickly because it knows which satellites to look for.

The term "cold start" refers to the power-on sequence and search algorithm when no navigation data is available to the receiver to establish a position fix (computed position coordinates). The term "cold" signifies that the receiver has no memory of its previous session, nor does it have a current almanac, satellite ephemeris, initial position, or time.

The present invention provides a method and apparatus for fast initialization of a satellite-based radio navigation receiver in the cold start mode such that it can quickly lock onto satellite signals with no information on the receiver position, the satellite position, or time estimates stored in the receiver's memory.

Figure 1:
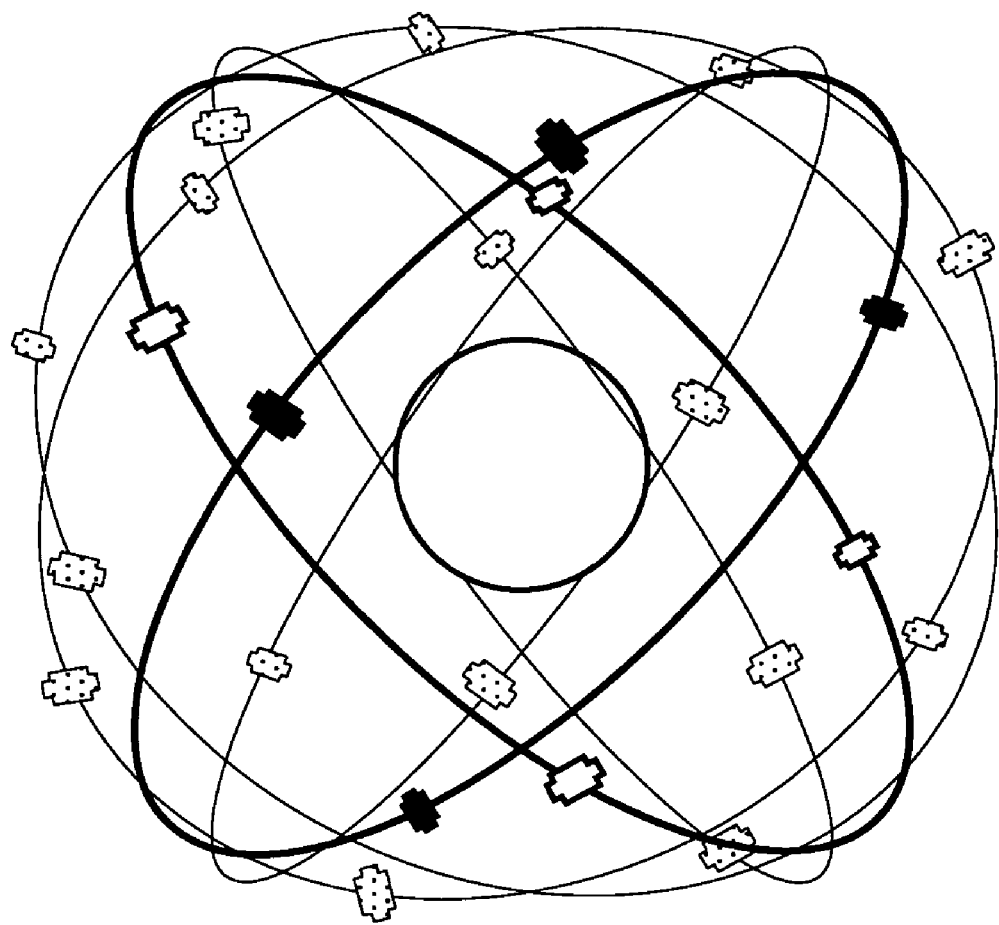
FIG. 1 shows a prior art arrangement in which eight satellites orbiting two of the six planes in the GPS satellite constellation are selected. The two selected orbital planes are substantially perpendicular to one another.
Figure 2:
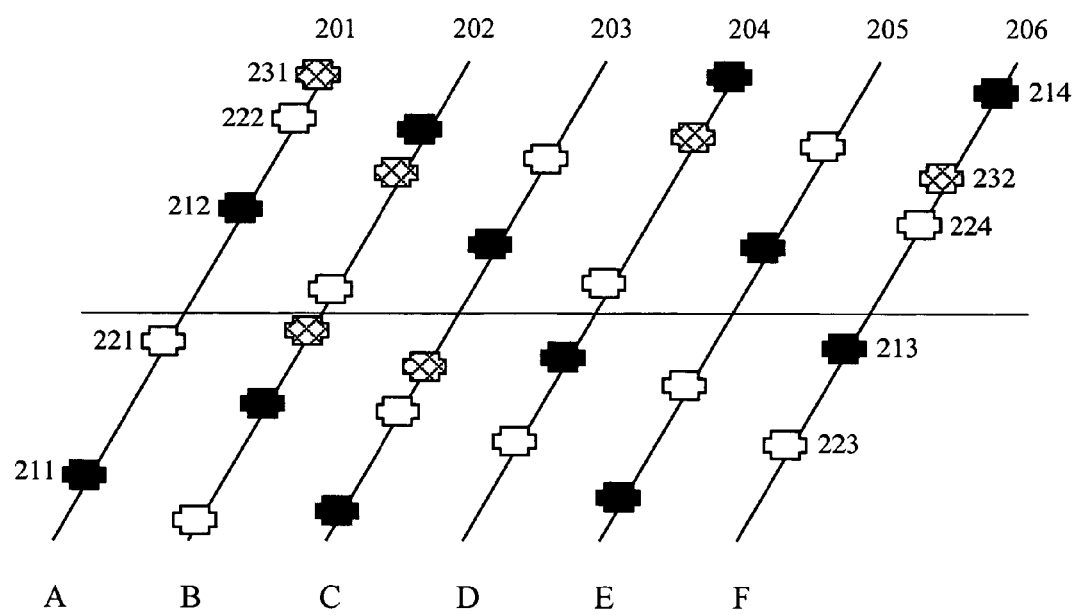
FIG. 2 illustrates an arrangement implementing the present invention in which all satellites in the GPS satellite constellation are divided into three groups. Each group thus consists of satellites selected from all six orbital planes, covering the entire surface of the Earth.

FIG. 2 illustrates the GPS satellite constellation in six orbits, hereinafter referred to as A, B, C, D, E, and F. These orbits are represented in FIG. 2 by inclined straight lines 201, 202, 203, 204, 205, and 206. In reality, the ends of the lines are joined together to form a circular shaped orbital plane. A number of satellites belong to each orbital plane, for instance, satellites 211, 221, 212, 222, and 231 are in orbital plane 201 and satellites 223, 213, 224, 232, and 214 are in orbital plane 206.

The actual number of GPS satellites in the constellation could be more than 24, with a maximum possible number of 32. Note that the present invention is applicable to any number of satellites and any type of satellite navigation system, including GLONASS and GALILEO.

The relative position between the satellites in the constellation at any given time remains almost the same. This is because all of the satellites have the same orbit period and their position is fixed (assigned) in the orbit.

According to the principle of the invention, all of the satellites in the constellation, regardless of their respective orbital planes, are divided into three groups. FIG. 2 illustrates a grouping arrangement in which black satellites are in a first group, white satellites are in a second group, and the rest (patterned) satellites are in a third group. For example, satellites 211, 212 of orbital plane 201 and satellites 213, 214 of orbital plane 206 are in the first group. Satellites 221, 222 of orbital plane 201 and satellites 223, 224 of orbital plane 206 are in the second group. Satellite 231 of orbital plane 201 and satellite 232 of orbital plane 206 are in the third group.

In this arrangement, two satellites are selected from each orbital plane for the first group and two satellites are selected from each orbital plane for the second group. The remaining satellites form the third group. Within each orbital plane, the two satellites are on the opposite side (indicated by the horizontal line in FIG. 2) of the surface of the Earth. As such, satellites in each group are evenly distributed around the Earth, providing a worldwide coverage. During initialization of the receiver in the cold start mode, the satellites are searched per group. This arrangement enables the receiver to quickly lock onto at least one (target) satellite.

Figure 3:
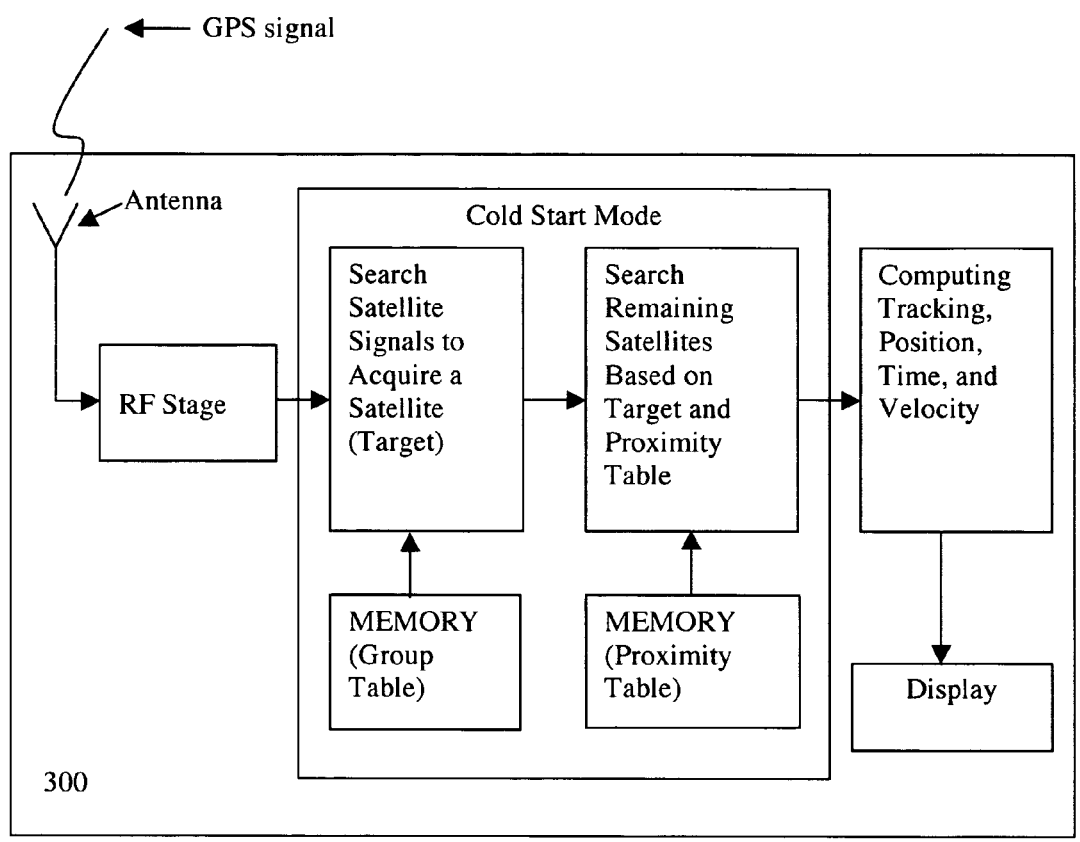
FIG. 3 depicts a functional diagram of an exemplary receiver implementing the present invention.

FIG. 3 depicts a functional diagram of an exemplary receiver 300 implementing the initialization algorithm and associated hardware, according to an embodiment of the present invention. The receiver 300 has a first memory for storing the groups by their identification numbers (PRN) and a second memory for storing a table of all possible satellites that may be the first to be detected. In a system having 32 satellites, the table is a 32×32 matrix or array, with each row dedicated to a target satellite. After detecting the satellites, the receiver 300 tracks them, obtains the embedded data, and computes the position, velocity, and time. The computed information is then displayed to a user.

Figure 4:
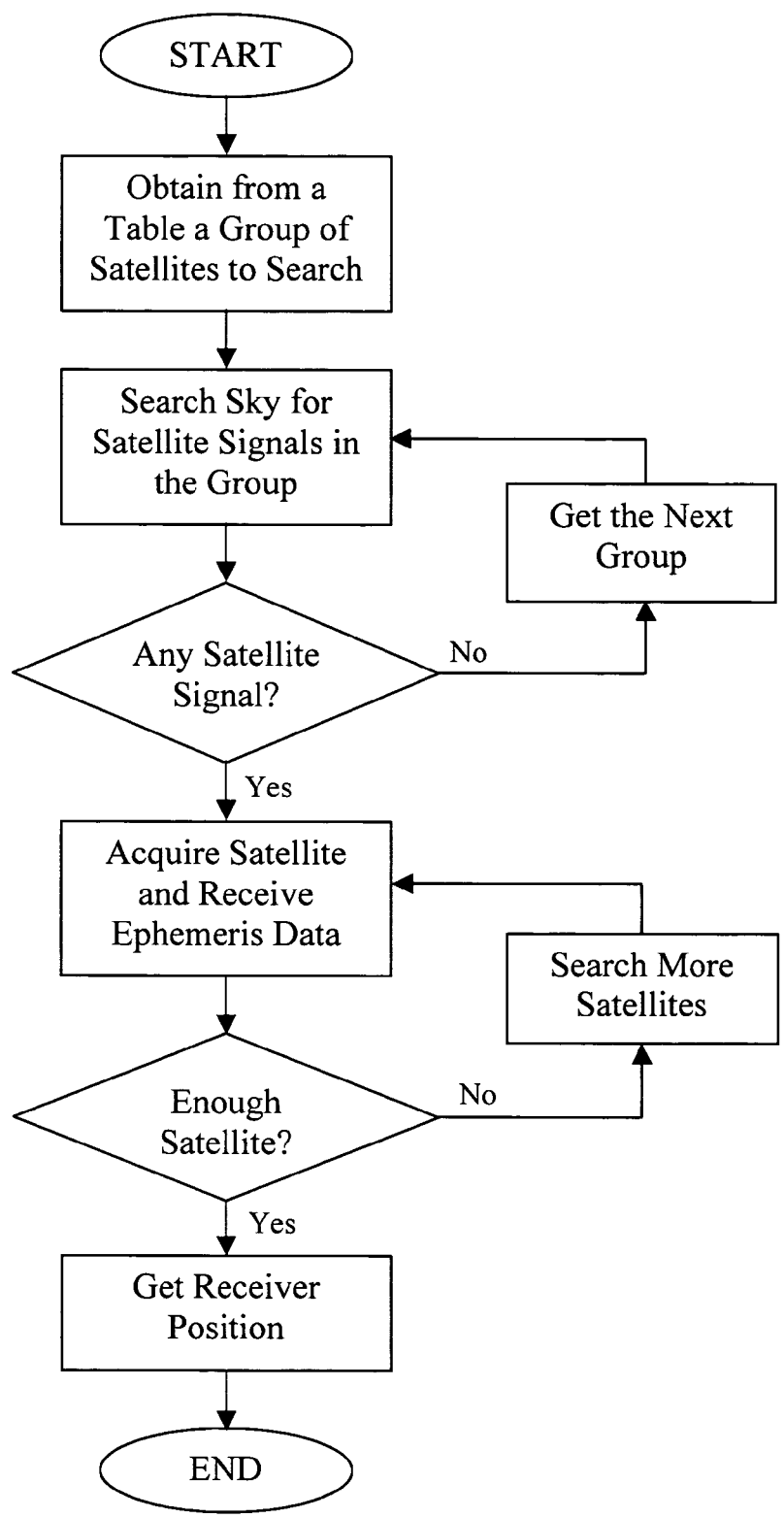
FIG. 4 is a flowchart illustrating an embodiment of the present invention.

FIG. 4 illustrates the initialization process in the cold start mode according to an embodiment of the present invention. When the receiver is initialized, it uses twelve channels to search for the satellites in the first group within the possible frequency range. In an embodiment, the first group consists of 12 satellites and at least one could be acquired at almost any position on the surface of the Earth.

If no satellite can be acquired in the first round, the receiver shifts twelve positions forward in the table to search the next group. This process is repeated until a satellite is acquired. In practice, in an open sky environment, the first satellite is almost always acquired in the first group search. Even when the sky is partially blocked, at least one satellite can still be acquired in the first or second group search.

Figure 5:
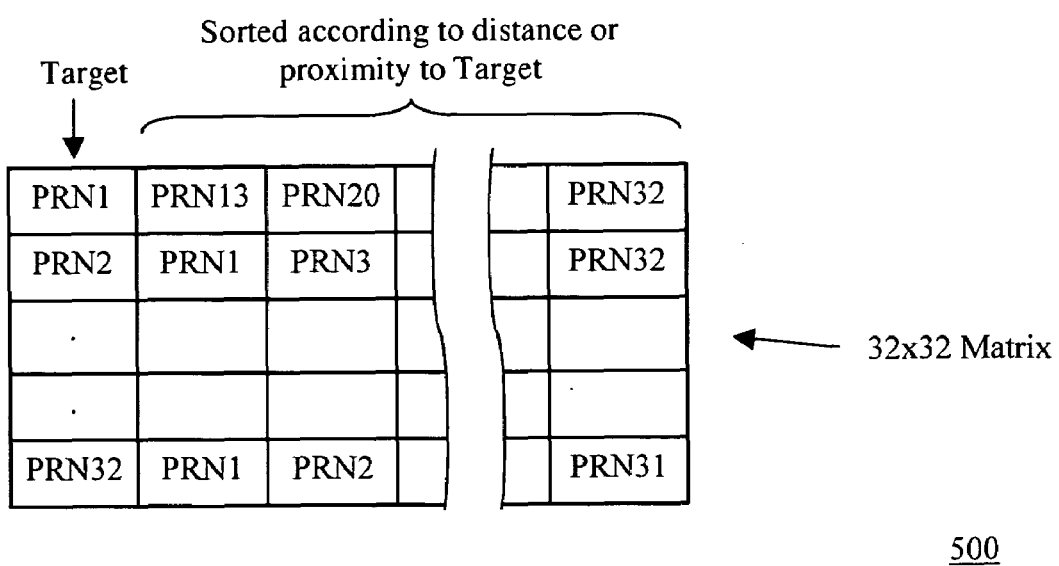
FIG. 5 shows an exemplary two-dimensional matrix according to an embodiment of the present invention.

After the receiver acquires at least one satellite, it acquires the other satellites. According to the invention, the first acquired satellite is referred to as the target satellite. Based on the slot and plane of each satellite, a two-dimensional matrix or table is generated. FIG. 5 shows an exemplary 32×32 two-dimensional matrix 500. The first row of this matrix 500 contains the pseudorandom noise (PRN) number of the 32 satellites sorted according to their distance or proximity to a target satellite, e.g., PRN1. The second row contains the same 32 PRN numbers sorted by the average proximity to another target satellite, in this case, PRN2. The rest of the rows in the matrix are similarly sorted.

The closer a satellite is to a target satellite, the closer the position of that satellite is to the target satellite in the corresponding row. Various methods can be used to measure the proximity of satellites to a target satellite. The present invention is not limited by any particular proximity measurement method, so long as the method employed is based on the statistics of the satellite position within an orbital period. In the case of GPS, the orbital period is actually 11 hours 58 minutes.

As an example, one suitable method calculates the average distance of all satellites to a target satellite in an orbital period of 11 hours 58 minutes. The shorter the average distance is, it is treated as being nearer (closer) to the target satellite.

Another method calculates the chance of adjacency. This method sorts the satellites by distance with respect to the target satellite and assigns a score accordingly. A high score means a satellite is very close to the target satellite. The scores are averaged with an orbital period of 11 hours 58 minutes. The satellite with the highest score is treated to be nearest to the target satellite, and so on.

Referring to FIGS. 4 and 5, after acquiring the first satellite, twelve satellites are selected from the matrix correspondingly. For example, if satellite PRN2 is acquired, then the first twelve satellites from the second row. Since satellites in the second row are sorted by their distance or proximity to the target satellite, i.e., PRN2, this maximizes the number of satellites that can be acquired at any position any time. If not enough satellites can be acquired to establish a position fix after searching these twelve satellites, the receiver continues to search the remaining satellites within the second row.

After a satellite is acquired, ephemeris can be completely downloaded within 30 seconds. Preferably, continuous satellite acquisition overlaps the ephemeris downloading process. With a sufficient number of satellite acquired and corresponding ephemeris received, a position fix can be established. In some embodiments, three satellites are sufficient to establish a position fix (TTFF). In some embodiments, the average TTFF utilizing the present invention is about 65 seconds.

As one skilled in the art will appreciate, the satellite detection process is highly stochastic and depends upon the time of day and the location of the receiver. Most of today's receivers contain 12 channels and can simultaneously search 12 satellites. However, searching the first 12 satellites at all 24 frequency bins takes a long time and there is no guarantee that a single satellite can be acquired during the first search. In the second set of 12 satellites, the receivers again must search most of the frequency bins before detecting a single satellite signal.

With the present invention, at least one satellite is assured to be detected in the search of first 12 satellites. Once a satellite signal is detected, the other satellites are searched quickly by way of a table. These other satellites are near the detected satellite and are arranged in the table by the increasing order of the frequency change from the detected satellite frequency. Thus, the detection of the remaining satellites is accomplished without searching all the frequency bins, but with a small portion of the frequency space.

Furthermore, since the detection of the remaining satellites is based on a proximity table, the present invention advantageously avoids the typical time consuming and computationally intensive ephemeris-based satellite acquisition process. The present invention also does not require storing the ephemeris data or periodical updates thereof.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention.

For example, the number of satellites to search in the first and/or second group may be varied depending upon the type of receiver. In the GPS embodiment disclosed herein, 12 was chosen because the receiver has 12 channels. However, more than 12 satellites may be in a group for better acquisition. The additional satellite(s) may have a low Doppler frequency and may require less time to acquire.

The GLONASS currently has 11 operational satellites and is anticipated to have a total of 24 satellites. The GLONASS system has only 3 orbital planes to accommodate all 24 satellites. The GLONASS system has better coverage near the polar region. Thus, it may be sufficient to have 12 satellites in each group, depending upon the final constellation. Again, according to the principle of the invention, these 12 satellites would be selected from all three orbital planes to cover the entire Earth. After the first satellite is acquired, the remaining satellites are searched based on the statistics of the satellite position within a GLONASS orbital period. As in the GPS embodiment, the statistics are stored in a two-dimensional matrix that accommodates all of the satellites in the GLONASS.

The GALILEO also has only three planes, with 27 active satellites and 3 spare. The final constellation is not yet clear, but 12 may be sufficient for the first and second search group. Again, according to the principle of the invention, these 12 satellites would be selected from all three orbital planes to cover the entire Earth. After the first satellite is acquired, the remaining satellites are searched based on a two-dimensional matrix that accommodates all of the satellites in the GALILEO system.

In cases where these systems are interoperable, the present invention can be implemented depending upon the satellite availability as a whole. That is, all satellites in two or three systems are appropriately divided into groups and the first group to search may contain 12, 18, or 24 satellites.

As an example, a hybrid receiver may be implemented with 24 channels such that the first 12 channels would search for the GPS signals and channels 13 to 24 may search for the GLONASS satellites. A wider bandwidth radio frequency (RF) stage with different downconverters may be used to get the intermediate frequency (IF) signals. The frequencies and PN code would be handled separately as the frequencies and one PN code used by the GLONASS are different from those of the GPS. The method of computation is also different and may be handled in sequential or in parallel, depending upon the type of the processor employed.

In a specific example of the invention, groups of satellites are formed to contain satellites from both the GPS and the GLONASS. 12 satellites are selected from the GPS and 12 are selected from the GLONASS. If the number of receiver channels is less than, say, 24, the available channels may be distributed among the GPS and the GLONASS satellites. As such, in case of a total of 18 channels, 12 channels are to the GPS satellites and 6 channels to the GLONASS satellites.

The GALILEO system uses a different signal modulation format and thus its satellites can be easily separated from GPS or GLONASS satellites. The signal processing is also different from the GPS and the GLONASS and has to be sequenced or paralleled with the GPS or the GLONASS in the same processor or using another processor.

Accordingly, the scope of the present invention should be determined by the following claims and their legal equivalents.

We claim:

1. A method of reducing initialization time of a satellite signal receiver, comprising the steps of:
   dividing navigational satellites of a positioning system into a plurality of groups such that each group has a fixed number of said navigational satellites uniformly distributed over entire surface of Earth; and
   configuring said receiver such that said receiver searches for navigational satellite signals per group in an assigned order to acquire a first satellite signal;
   generating a two-dimensional (2D) matrix based on slot and plane of each of said navigational satellites; wherein
   each row of said matrix contains unique identifiers of said navigational satellites; wherein each row has a target satellite; and wherein
   each row is sorted by distance or proximity of each remaining navigational satellite in relation to said target satellite;
   acquiring additional navigation satellite signals;
   computing receiver position using the acquired first and additional satellite signals; and
   displaying the computed receiver position.

2. The method of claim 1, wherein
   said groups comprises a first group, a second group, and a third group.

3. The method of claim 2, wherein
   said first group and said second group each has 12 navigational satellites.

4. The method of claim 1, further comprising the step of:
   selecting two navigational satellites from each orbit plane.

5. The method of claim 1, wherein
   each of said unique identifiers is a pseudo random noise (PRN) number uniquely identifying one of said navigational satellites.

6. The method of claim 1, further comprising the step of:
   determining said distance or proximity based on statistics of positions of said navigational satellites within an orbital period.

7. The method of claim 6, wherein said orbital period is 11 hours 58 minutes.

8. The method of claim 6, further comprising the step of:
   determining an average distance or proximity of each remaining navigational satellite from the target satellite within the orbital period; and
   for each row, sorting each remaining navigational satellite according to its average distance or proximity from the target satellite within the orbital period.

9. The method of claim 6, further comprising the step of:
   assigning a score to each remaining navigational satellite based on distances of the navigational satellites from the target satellite within the orbital period;
   for each row, sorting each remaining navigational satellite according to its assigned score.

10. The method of claim 1, further comprising the step of:
    selecting twelve of said navigational satellites from said matrix after said first satellite signal is acquired.

11. The method of claim 1, further comprising the step of:
    locating a target satellite in the matrix whose unique identifier matches that of said first satellite signal acquired by the receiver; and
    selecting first twelve navigational satellites from a row containing said matched unique identifier.

12. The method of claim 11, further comprising the step of:
    searching navigational satellites that follow said first twelve navigational satellites and that are within said row.

13. The method of claim 11, wherein
    said positioning system is a global positioning (GPS), Global'naya Navigatsionnaya Sputnikovaya Sistema (GLONASS), an European satellite navigation system (GALILEO) system, or a combination thereof.

14. A method of initializing a satellite signal receiver, comprising the steps of:
    searching a first group of twelve navigational satellites uniformly distributed over entire surface of Earth;
    acquiring a first navigational satellite signal from said first group; and acquiring remaining navigational satellite signals based on a two-dimensional matrix containing identification and statistical information of all navigational satellites of a positioning system, wherein
    each row of said matrix contains unique identifiers of said navigational satellites;
    each row has a target satellite; and
    each row is sorted by distance or proximity of each non-target navigational satellite in relation to said target satellite;
    computing receiver position using the acquired first and remaining satellite signals; and displaying the computed receiver position.

15. The method of claim 14, wherein
    each of said unique identifiers is a pseudo random noise (PRN) number uniquely identifying one of said navigational satellites.

16. The method of claim 14, wherein
    said positioning system is a global positioning (GPS), Global'naya Navigatsionnaya Sputnikovaya Sistema (GLONASS), an European satellite navigation system (GALILEO) system, or a combination thereof.

17. A method of initializing a satellite signal receiver, comprising the steps of:
    searching a first group of twelve navigational satellites uniformly distributed over entire surface of Earth;
    acquiring a first navigational satellite signal from said first group; and acquiring remaining navigational satellite signals based on a two-dimensional matrix containing identification and statistical information of all navigational satellites of a positioning system, wherein said distance or proximity is determined based on statistics of positions of said navigational satellites during an orbital period;
    computing receiver position using the acquired first and remaining satellite signals; and
    displaying the computed receiver position.

18. The method of claim 17, wherein said orbital period is 11 hours 58 minutes.

19. A method of initializing a satellite signal receiver, comprising the steps of:
    searching a first group of twelve navigational satellites uniformly distributed over entire surface of Earth;
    acquiring a first navigational satellite signal from said first group; and acquiring remaining navigational satellite signals based on a two-dimensional matrix containing identification and statistical information of all navigational satellites of a positioning system;

computing receiver position using the acquired first and remaining satellite signals; and displaying the computed receiver position;

wherein if no navigational satellite signal is acquired from said first group, further comprising the step of:

searching a second group of twelve navigational satellites uniformly distributed over entire surface of Earth; and acquiring said first navigational satellite signal from said second group.

* * * * *